US012654696B2

(12) United States Patent
    Kim

(10) Patent No.: US 12,654,696 B2
(45) Date of Patent: Jun. 16, 2026

(54) LANE DEPARTURE PREVENTION SYSTEM AND CONTROL METHOD THEREOF

(71) Applicant: HL Klemove Corp., Incheon (KR)

(72) Inventor: Hyun Beom Kim, Incheon (KR)

(73) Assignee: HL Klemove Corp., Incheon (KR)

( * ) Notice: Subject to any disclaimer, the term of this patent is extended or adjusted under 35 U.S.C. 154(b) by 8 days.

(21) Appl. No.: 18/795,180

(22) Filed: Aug. 6, 2024

(65) Prior Publication Data

US 2025/0074410 A1    Mar. 6, 2025

(30) Foreign Application Priority Data

Aug. 29, 2023    (KR) ........................ 10-2023-0113239

(51) Int. Cl.
    *B60W 30/12* (2020.01)
    *B60W 10/18* (2012.01)
    *B60W 10/20* (2006.01)
    *B60W 50/14* (2020.01)

(52) U.S. Cl.
    CPC ............ *B60W 30/12* (2013.01); *B60W 10/18* (2013.01); *B60W 10/20* (2013.01); *B60W 50/14* (2013.01); *B60W 2420/403* (2013.01); *B60W 2520/105* (2013.01)

(58) Field of Classification Search
    None
    See application file for complete search history.

(56) References Cited

U.S. PATENT DOCUMENTS

| | | | | |
|---|---|---|---|---|
| 6,970,777 | B2 * | 11/2005 | Tange ................. | B60T 8/17557 701/41 |
| 8,594,890 | B2 * | 11/2013 | Imai ...................... | B60W 30/12 348/148 |
| 9,434,383 | B2 * | 9/2016 | Kim ...................... | B60W 10/20 |
| 10,640,109 | B2 * | 5/2020 | Nagatsuka ............. | B60K 35/22 |
| 10,688,976 | B2 * | 6/2020 | Mitsumoto .............. | B60T 8/58 |
| 11,092,967 | B2 * | 8/2021 | Akiyama ............ | B60W 30/095 |
| 11,548,487 | B2 * | 1/2023 | Mitsumoto ......... | B60T 8/17557 |
| 11,718,294 | B2 * | 8/2023 | Omikawa ............. | B60W 30/12 701/41 |
| 11,731,631 | B2 * | 8/2023 | Takahashi ............. | B60W 10/20 701/25 |

(Continued)

FOREIGN PATENT DOCUMENTS

| | | | | | |
|---|---|---|---|---|---|
| CN | 115703465 | A | * | 2/2023 | ............ B60W 30/12 |
| CN | 118665450 | A | * | 9/2024 | ............ B60W 40/06 |

(Continued)

*Primary Examiner* — Kevin R Steckbauer
(74) *Attorney, Agent, or Firm* — Harvest IP Law, LLP

(57) ABSTRACT

The present disclosure relates to a lane departure prevention system and a control method thereof, and the lane departure prevention system includes: a sensor unit provided in a vehicle, and acquiring front road information of the vehicle and dynamic information of the vehicle; a steering unit controlling a driving direction of the vehicle; a braking unit controlling braking of the vehicle; and a control unit provided in the vehicle, and preventing lane departure of the vehicle by controlling at least one of the steering unit and the braking unit so as to prevent the vehicle from departing from a lane based on the front road information and the dynamic information.

17 Claims, 4 Drawing Sheets

(56) References Cited

U.S. PATENT DOCUMENTS

| | | | | |
|---|---|---|---|---|
| 11,780,459 B2 * | 10/2023 | Honda | B60W 50/14 | |
| | | | 340/438 | |
| 11,814,099 B2 * | 11/2023 | Omikawa | B60W 50/0097 | |
| 12,043,277 B2 * | 7/2024 | Honda | B60W 40/08 | |
| 12,049,252 B2 * | 7/2024 | Fujii | G05D 1/249 | |
| 12,263,838 B2 * | 4/2025 | Itazuri | B60W 50/14 | |
| 12,330,642 B2 * | 6/2025 | Zarringhalam | B60W 10/20 | |
| 2005/0113999 A1 * | 5/2005 | Tange | B60W 10/20 | |
| | | | 701/41 | |
| 2012/0320210 A1 * | 12/2012 | Imai | B60W 50/14 | |
| | | | 348/148 | |
| 2016/0152234 A1 * | 6/2016 | Kim | B60W 10/20 | |
| | | | 701/41 | |
| 2018/0086340 A1 * | 3/2018 | Nagatsuka | B62D 15/025 | |
| 2018/0134267 A1 * | 5/2018 | Mitsumoto | B60T 8/58 | |
| 2018/0178802 A1 * | 6/2018 | Miyata | B60W 30/095 | |
| 2018/0297640 A1 * | 10/2018 | Fujii | B62D 6/04 | |
| 2019/0196487 A1 * | 6/2019 | Akiyama | B60W 30/18163 | |
| 2020/0108827 A1 * | 4/2020 | Kanoh | B60W 30/12 | |
| 2020/0238980 A1 * | 7/2020 | Goto | B60W 30/09 | |
| 2020/0254987 A1 * | 8/2020 | Mitsumoto | B60T 8/17557 | |
| 2020/0353918 A1 * | 11/2020 | Goto | B60W 30/095 | |
| 2021/0046928 A1 * | 2/2021 | Ohmura | B60W 50/12 | |
| 2021/0061271 A1 * | 3/2021 | Omikawa | B60W 30/12 | |
| 2021/0188356 A1 * | 6/2021 | Goto | B62D 6/00 | |
| 2021/0362720 A1 * | 11/2021 | Takahashi | B62D 6/003 | |
| 2022/0063722 A1 * | 3/2022 | Omikawa | B60W 50/0097 | |
| 2022/0153292 A1 * | 5/2022 | Honda | B60W 50/16 | |
| 2023/0055183 A1 * | 2/2023 | Itazuri | B60W 50/14 | |
| 2023/0174059 A1 * | 6/2023 | Ivanovic | B60W 40/072 | |
| | | | 701/1 | |
| 2023/0399007 A1 * | 12/2023 | Honda | B60W 30/12 | |
| 2024/0149878 A1 * | 5/2024 | Omagari | B60W 40/109 | |
| 2024/0308499 A1 * | 9/2024 | Kobayashi | B60W 30/025 | |
| 2025/0018940 A1 * | 1/2025 | Zarringhalam | B60W 30/12 | |
| 2025/0074410 A1 * | 3/2025 | Kim | B60W 50/14 | |

FOREIGN PATENT DOCUMENTS

| | | | | | |
|---|---|---|---|---|---|
| CN | 118722634 A | * | 10/2024 | | B60W 60/001 |
| CN | 119305550 A | * | 1/2025 | | B62D 6/00 |
| DE | 102022132422 A1 | * | 6/2023 | | B60W 40/072 |
| DE | 102023128705 A1 | * | 1/2025 | | B62D 6/00 |
| EP | 3663152 A1 | * | 6/2020 | | B60W 30/162 |
| EP | 3663153 A1 | * | 6/2020 | | G08G 1/166 |
| EP | 3730366 A1 | * | 10/2020 | | B60W 40/08 |
| JP | 2007296919 A | * | 11/2007 | | |
| JP | 5088266 B2 | * | 12/2012 | | |
| JP | 2018076030 A | * | 5/2018 | | B60W 30/12 |
| JP | 6569647 B2 | * | 9/2019 | | B60W 30/02 |
| JP | 7476771 B2 | * | 5/2024 | | B60W 30/12 |
| JP | 7477236 B2 | * | 5/2024 | | B62D 6/003 |
| JP | 7719596 B2 | * | 8/2025 | | B62D 15/025 |
| KR | 100650474 B1 | * | 11/2006 | | B60T 8/17557 |
| KR | 20160056096 A | * | 5/2016 | | B60W 30/12 |
| KR | 101655587 B1 | * | 9/2016 | | B60W 10/184 |
| KR | 20180128670 A | * | 12/2018 | | B60W 30/12 |
| KR | 102195364 B1 | * | 12/2020 | | B60W 40/105 |
| KR | 20250033391 A | * | 3/2025 | | B60W 40/107 |

* cited by examiner

LANE DEPARTURE PREVENTION SYSTEM AND CONTROL METHOD THEREOF

TECHNICAL FIELD

The present disclosure relates to a lane departure prevention system and a control method thereof, and more particularly, to a lane departure prevention system provided to prevent a driving vehicle from departing from a lane, and a control method thereof.

BACKGROUND

Recently, the development of unmanned vehicles has been actively developed. With the development of the unmanned vehicles, it is necessary for the vehicle to autonomously perform various things that people have judged and performed. In addition, various convenience devices are being developed and applied to the vehicle so that people can drive the vehicle safely and conveniently, in addition to the unmanned vehicles.

One of them is a Lane Keeping Control System (LKCS), which detects the lane using a front camera mounted on the vehicle, then plans a driving path in the lane and performs a control to follow a target path by using an active control of an electronic power steering (EPS) to provide convenience to the driver, or detects an unintended lane departure, and performs a lane keeping control using the active control of the EPS to assist the driver.

In the lane keeping control system described above, there is a problem in that since the lane departure is prevented by using the steering of the vehicle, there is a limit in a transverse acceleration which can be produced according to the performance of a steering actuator, so it is not easy to completely prevent the departure.

In addition, if the lane departure is intended to be prevented only by the steering of the vehicle in a fast driving state, there is a risk of an accident due to unreasonable rotation.

Therefore, there is a need for developing a lane departure prevention system in which braking and steering are performed combinationally in order to prevent the lane departure when a speed of an ego car is too fast or a curve of the lane is sharp.

SUMMARY

In view of the above, the present disclosure provides a lane departure prevention system which may predict a path in which a vehicle is driven, and safely prevent the departure from a lane while controlling braking and driving of a vehicle when the driving vehicle is likely to depart from the predicted path, and a control method thereof.

According to an embodiment of the present disclosure, a lane departure prevention system includes: a sensor unit provided in a vehicle, and acquiring front road information of the vehicle and dynamic information of the vehicle; a steering unit controlling a driving direction of the vehicle; a braking unit controlling braking of the vehicle; and a control unit provided in the vehicle, and preventing lane departure of the vehicle by controlling at least one of the steering unit and the braking unit so as to prevent the vehicle from departing from a lane based on the front road information and the dynamic information.

Furthermore, the control unit derives an expected path which the vehicle is to follow while being driven based on the front road information.

Furthermore, the lane departure prevention system further includes a display outputting an image, and the display outputs the expected path for a driver of the vehicle to confirm the expected path with the naked eye.

Furthermore, the control unit derives a transverse acceleration and a transverse acceleration derivative value of the vehicle based on the dynamic information.

Furthermore, the control unit compares the transverse acceleration and the transverse acceleration derivative value with set thresholds to determine a vehicle departure possibility of the vehicle.

Furthermore, the control unit includes a reception unit receiving the front road information and the dynamic information, a derivation unit deriving the expected path, and the transverse acceleration and the transverse acceleration derivative value, a determination unit determining the lane departure possibility of the vehicle, a steering control unit calculating a steering angle value to control the steering unit according to determination of the determination unit, and a braking control unit calculating a deceleration value to control the braking unit according to the determination of the determination unit.

Furthermore, the sensor unit includes a camera provided to acquire the front road information, and one or more speed sensors provided to acquire the dynamic information.

According to another embodiment of the present disclosure, a control method of a lane departure prevention system includes: acquiring front road information and dynamic information of a vehicle; deriving a driving expected path of the vehicle based on the front road information; determining a lane departure possibility that the vehicle departs from the expected path based on the front road information and the dynamic information; and controlling at least one of braking and steering of the vehicle when it is determined that the vehicle departs from a lane in the determining of the lane departure possibility.

Furthermore, the determining of the lane departure possibility includes deriving a transverse acceleration and a transverse acceleration derivative value based on the dynamic information, and comparing the transverse acceleration and the transverse acceleration derivative value with set thresholds.

Furthermore, when it is determined that the transverse acceleration and the transverse acceleration derivative value are more than the set thresholds in the comparing, both braking control of the vehicle and steering control of the vehicle are performed in the controlling of at least one of the braking and the steering of the vehicle.

Furthermore, when both the braking control of the vehicle and the steering control of the vehicle are performed, the braking control of the vehicle is first performed, and the steering control of the vehicle is performed.

Furthermore, the braking control of the vehicle is repeated until the transverse acceleration and the transverse acceleration derivative value become equal to or less than the set thresholds.

Furthermore, the braking control of the vehicle includes calculating a time up to a time point when a lane on which the vehicle is driven and the expected path cross, and deriving a deceleration value based on the calculated time, and delivering the derived deceleration value to a braking unit.

Furthermore, the steering control of the vehicle includes calculating a steering angle value required for following the expected path, and delivering the calculated steering angle value to a steering unit.

Furthermore, when it is determined that the transverse acceleration and the transverse acceleration derivative value are equal to or less than the set thresholds in the comparing, the steering control of the vehicle is performed in the controlling of at least one of the braking and the steering of the vehicle.

Furthermore, the steering control of the vehicle includes calculating a steering angle value required for following the expected path, and delivering the calculated steering angle value to a steering unit.

Furthermore, a sensor unit including a camera and a speed sensor is provided in the vehicle, and in the acquiring of the front road information and the dynamic information, the camera acquires the front road information and the speed sensor acquires the dynamic information.

Furthermore, a display outputting an image is provided in the vehicle, and the control method further includes, before the determining of the lane departure possibility, outputting the derived expected path through the display.

Details of other embodiments will be included in the detailed description and the accompanying drawings.

The lane departure prevention system and the control method thereof according to the present disclosure have the following effects.

First, when it is expected that the vehicle departs from the lane, the vehicle can be prevented from departing from the lane by controlling actuation of the steering unit.

Second, when it is expected that the vehicle departs from the lane, if the prevention of the lane departure is difficult only by the steering unit, the speed of the vehicle is reduced by controlling the actuation of the braking unit, and then the steering is controlled, thereby more safely preventing the lane departure.

DETAILED DESCRIPTION

Figure 1:
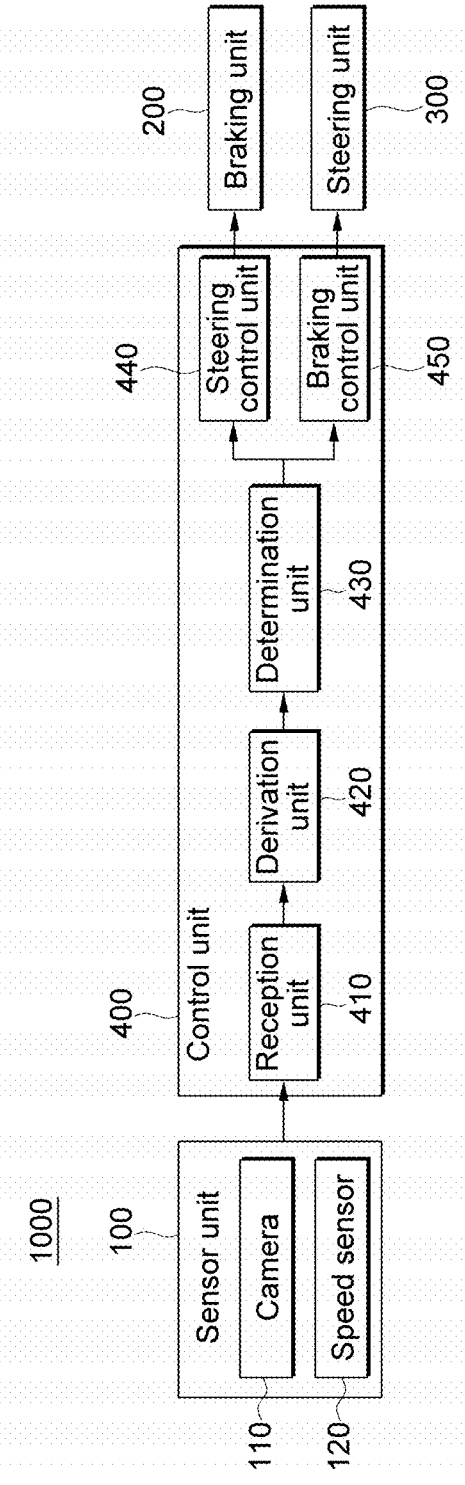
FIG. 1 is a block diagram illustrating a configuration of a lane departure prevention system according to an embodiment of the present disclosure.
Figure 2:
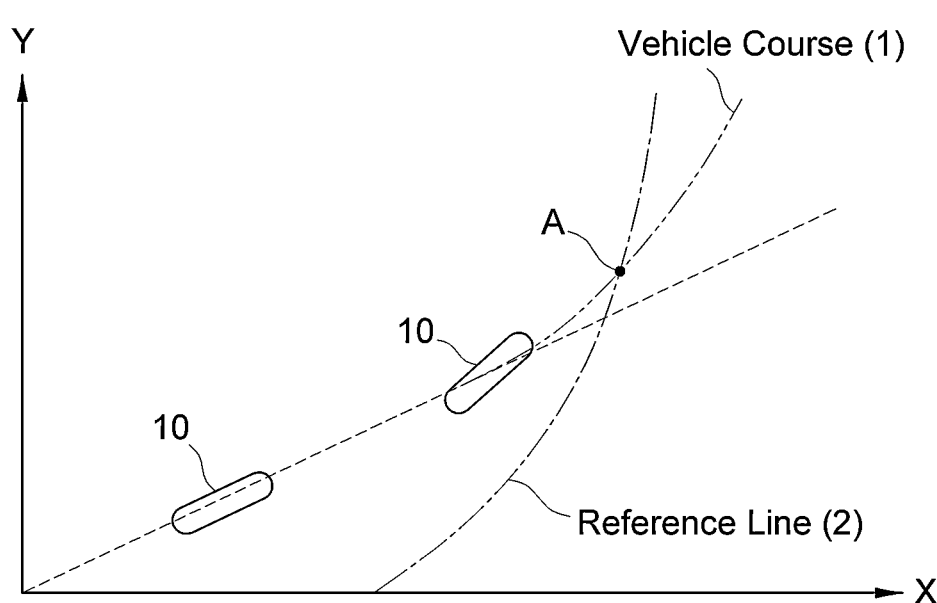
FIG. 2 is a graph for describing calculation of a time point when a lane and an expected path cross in a lane departure prevention control method.

Hereinafter, an embodiment of the present disclosure will be described more fully hereinafter with reference to the accompanying drawings so as to be easily implemented by those skilled in the art. The present disclosure may be implemented in various different forms and is not limited to embodiments described herein.

The drawings are schematic and not illustrated according to a scale. The relative dimensions and ratios of the parts in the drawings are exaggerated or reduced in their sizes for clarity and convenience in the drawings, and any dimensions are just exemplary, not limited. In addition, the same structure element or component in two or more drawings is used to show similar characteristics of the same reference numeral.

An embodiment of the present disclosure specifically illustrates an ideal embodiment of the present disclosure. As a result, various modifications of the diagrams are expected. Therefore, the embodiment is not limited to a specific form of the illustrated and, for example, also includes a modification of the form of manufacture.

Hereinafter, a lane departure prevention system and a control method thereof according to the present disclosure will be described in detail with reference to FIGS. 1 to 4. First, a lane departure prevention system according to an embodiment of the present disclosure will be described with reference to FIG. 1. The lane departure prevention system 1000 includes a sensor unit 100, a steering unit 200, a braking unit 300, and a control unit 400.

The sensor unit 100 is provided in a vehicle, and is used for acquiring front road information of the vehicle and dynamic information of the vehicle. In the embodiment, the sensor unit 100 includes a camera 100 and a speed sensor 120.

The camera 100 is generally positioned at a front of the vehicle and acquires front road information when the vehicle is driven. The front road information acquired by the camera 110 includes a position, a heading angle, a curvature, a curvature change amount, etc., of a lane.

The speed sensor 120 is provided to acquire dynamic information of the vehicle. The dynamic information includes a longitudinal speed, a transverse speed, a yaw-rate, a longitudinal acceleration, and a transverse acceleration.

The front road information and the dynamic information acquired by the sensor unit 100 are delivered to the control unit 400.

The control unit 400 receives information through the sensor unit 100, and determines whether a currently driving vehicle departs from the lane through the received information to prevent the vehicle from departing from the lane by controlling the steering unit 200 and the braking unit 300.

The control unit 400 includes a reception unit 410, a derivation unit 420, a determination unit 430, a steering control unit 440, and a braking control unit 450.

The reception unit 410 receives the front road information delivered from the sensor unit 100, and the derivation unit 420 derives an expected path to be followed by predicting the driving of the vehicle based on the front road information.

The derived expected path of the vehicle may be just stored in the control unit 400, and may be output to be confirmed with the naked eye by a driver.

When the expected path of the vehicle is output, the lane departure prevention system 1000 may further include a display (not illustrated). The display (not illustrated) may be separately provided inside the vehicle, but as the display (not illustrated), a dashboard (not illustrated) provided inside the vehicle may also be used.

The driver may confirm the expected path of the vehicle output through the display (not illustrated) with the naked eye to confirm whether the lane departure prevention system is normally operated.

Further, the reception unit 410 receives the dynamic information, and the derivation unit 420 derives a transverse acceleration and a transverse acceleration derivative value of the vehicle based on the dynamic information. The transverse acceleration of the vehicle means an acceleration in which the vehicle moves horizontally, and the transverse acceleration derivative value indicates a change rate of the transverse acceleration.

That is, when the vehicle is unable to follow the expected path, and is likely to depart from the lane, a value required for the vehicle to turn a curve is derived to follow the expected path of the vehicle.

The determination unit 430 compares the derived transverse acceleration and transverse acceleration derivative value with set thresholds to determine whether the vehicle is to follow the expected path.

The vehicle is controlled not to depart from the lane while following the expected path according to the determination by the determination unit 430. Specifically, the control unit 400 controls the actuation of at least one of the steering unit 200 and the braking unit 300 to prevent the vehicle from departing from the lane.

The determination unit 430 compares the transverse acceleration and the transverse acceleration derivative value with the set thresholds to determine whether to control only the steering unit 200 or whether to control both the steering unit 200 and the braking unit 300.

When the determination unit 430 determines that the transverse acceleration and the transverse acceleration derivative value are equal to or smaller than the set thresholds, the steering control unit 440 prevents the vehicle from departing from the lane by controlling only the steering unit 200.

On the contrary, when the determination unit 430 determines that the transverse acceleration and the transverse acceleration derivative value are more than the set thresholds, the steering control unit 440 and the braking control unit 450 prevent the vehicle from departing from the lane by controlling the steering unit 200 and the braking unit 300.

In such a case, the braking control unit 450 confirms whether the transverse acceleration and the transverse acceleration derivative value decrease to the set thresholds or less while first controlling the braking unit 300, and then when the transverse acceleration and the transverse acceleration derivative value become equal to or less than the set thresholds, the steering control unit 440 prevents the vehicle from departing from the lane by controlling the steering unit 200.

The steering control unit 440 calculates a steering angle value for controlling the steering unit 200. When the steering angle value is calculated, the calculated angle value is delivered to the steering unit 200, and the steering unit 200 adjusts a handle (not illustrated) according to the delivered steering angle value to allow the vehicle to follow the expected path of the vehicle without departing from the lane.

The braking control unit 450 also calculates a braking value for controlling the braking unit 300. This is described as follows in detail with reference to FIG. 2. First, the braking control unit 450 calculates a time up to a time point A when a lane 1 on which a vehicle 10 is driven and an expected path 2 of the vehicle cross. In addition, a deceleration value is calculated based on the calculated time, and the calculated deceleration value becomes the braking value for controlling the braking unit 300. The deceleration value calculated by the braking control unit 450 is determined within a range of 0 to 1 g.

The steering unit 200 adjusts a driving direction of the vehicle. The steering unit 200 is controlled by manipulation of the driver of the vehicle, but as described above, the steering unit 200 may also be controlled by the steering control unit 440, and when the steering unit 200 is controlled by the steering control unit 440, the lane departure of the vehicle may be prevented.

The braking unit 300 adjusts the braking of the vehicle. The braking unit 300 is controlled by the manipulation of the vehicle driver similarly to the steering unit 200. However, the braking unit 300 is also controlled by the braking control unit 450 to prevent the lane departure of the vehicle.

Hereinafter, the control method of the lane departure prevention system according to an embodiment of the present disclosure will be described in detail with reference to FIGS. 3 to 4.

Figure 3:
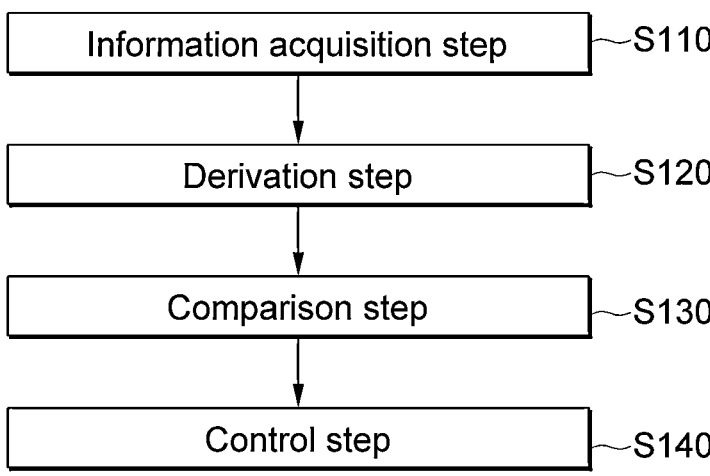
FIGS. 3 and 4 are flowcharts illustrating a lane departure prevention control method by a lane departure prevention system according to an embodiment of the present disclosure.
Figure 4:
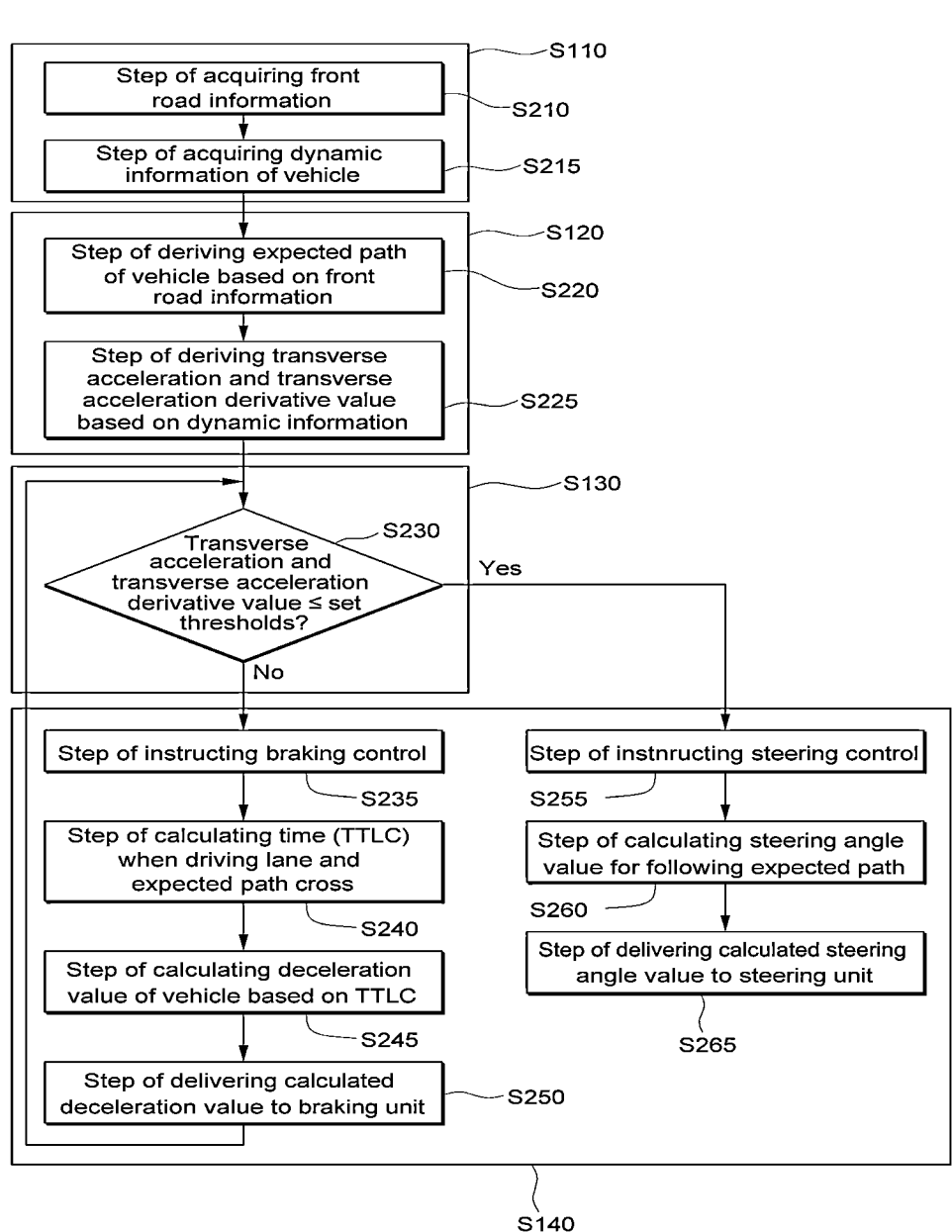

First, the control method of the lane departure prevention system generally includes an information acquisition step (step S110), a derivation step (step S120), a comparison step (step S130), and a control step (step S140) by referring to FIG. 3. The information acquisition step (step S110) is conducted by the sensor unit 100, the derivation step (step S120) and the comparison step (S130) are conducted by the control unit 400, and the control step (step S130) is conducted by the control unit 400, the steering unit 200, and the braking unit 300.

A more specific control method will be described with reference to FIG. 4.

When an operation of the vehicle starts, a step of acquiring front road information and dynamic information of the vehicle is first conducted (steps S210 and S215). The sensor unit 100 including the camera 110 and the speed sensor 120 is provided in the vehicle, so the front road information and the dynamic information are acquired through the sensor unit 100.

The front road information of the vehicle is acquired through the camera 110, and the dynamic information of the vehicle is acquired through the speed sensor 120. The information acquired by the sensor unit 110 is delivered to the reception unit 410 of the control unit 400.

The reception unit 410 receives the front road information, and the derivation unit 420 derives an expected path of the vehicle based on the front road information (step S220). The derivation unit 420 may store an equation to derive the expected path, and the front road information delivered from the sensor unit 110 is applied to the equation to derive the expected path.

The derivation unit 420 derives a transverse acceleration and a transverse acceleration derivative value based on the dynamic information received by the reception unit 410 (step S225). The transverse acceleration and transverse acceleration derivative value derived by the derivation unit 420 are used for determining whether to perform only steering control or whether to perform both the steering control and the braking control in controlling the vehicle in order to prevent the lane departure of the vehicle.

Next, the determination unit 430 compares the derived transverse acceleration and acceleration derivative values with set thresholds (step S230). Comparing, by the determination unit 430, the transverse acceleration and the transverse acceleration derivative value with the set thresholds is used for determining whether to control to prevent the lane departure only through the steering unit 200 or whether to control to prevent the lane departure by using both the steering unit 200 and the braking unit 300.

That is, according to a comparison result in step S230 above, the control unit 400 prevents the lane departure of the vehicle, and determines whether to prevent the lane departure by controlling only the steering unit 200 or whether to prevent the lane departure by controlling both the braking unit 300 and the steering unit 200.

More specifically, when it is determined that the transverse acceleration and the transverse acceleration derivative value are more than the set thresholds in step S230 above, the braking control unit 450 instructs to perform the braking control through the braking unit 300 (step S235).

In order to perform the braking control through the braking unit 300, the braking control unit 450 first calculates a time (time to lane crossing (TTLC) up to a time point A when the lane 1 on which the vehicle is driven and the expected path 2 derived through the front road information cross (step S240).

In addition, the deceleration value is calculated based on the calculated time (step S240), and the calculated deceleration value is delivered to the braking unit 300 (step S245). The deceleration value derived by the braking control unit 450 is determined within a range of 0 to 1 g. For example, as the time up to the crossing time point A is shorter, the deceleration value is determined as a value close to 1 g, and as the time up to the crossing time point A is longer, the deceleration value is determined as a value close to 0 g.

Meanwhile, after performing the braking of the vehicle while performing steps S235 and S250 of performing the braking control by the braking control unit 450, the determination unit 430 repeats step S230 above. In this case, if the transverse acceleration and the transverse acceleration derivative value do not decrease to the set thresholds or less in step S230 above, steps S235 to S250 are repeatedly performed again.

That is, while steps S230 to S250 are repeated until it is determined that the transverse acceleration and the transverse acceleration derivative value are equal to or less than the set thresholds, the braking control of the vehicle is continuously performed. In addition, steps S230 to S250 above are repeated, and when the transverse acceleration and the transverse acceleration derivative value are compared with the set thresholds again in step S230, if it is determined that the transverse acceleration and the transverse acceleration derivative value are equal to or less than the set thresholds, the braking control of the vehicle is stopped, and the steering control unit 440 instructs to perform the steering control through the steering unit 200 (step S255).

The steering control unit 440 calculates a steering angle value required for following the expected path in order to perform the steering control (step S260). The steering control unit 440 stores an equation for calculating the steering angle value, and calculates the steering angle value by using the front road information and the dynamic information delivered through the sensor unit 100.

The steering control unit 440 delivers the calculated steering angle value to the steering unit 200 (step S265). The steering unit 200 manipulates the handle to be rotated according to the steering angle value delivered from the steering control unit 440 to allow the vehicle to follow the expected path without departing from the lane.

In the above description, it is described that the transverse acceleration and the transverse acceleration derivative value are more than the set thresholds, and the steering control is sequentially performed after the braking control to prevent the lane departure in step S230 above.

However, in initial step S230 above, it may also be determined that the transverse acceleration and the transverse acceleration derivative value are equal to or less than the set thresholds, and in this case, the departure from the lane may be prevented by performing the steering control through step S255 to S260 above.

Hereinabove, the embodiments of the present disclosure have been described with the accompanying drawings, but it can be understood by those skilled in the art that the present disclosure can be executed in other detailed forms without changing the technical spirit or requisite features of the present disclosure.

Therefore, the embodiments described as above are exemplary in all aspects and should be understood as not being restrictive and the scope of the present disclosure is represented by claims to be described below, and it is to be interpreted that the meaning and scope of the claims and all the changes or modified forms derived from the equivalents thereof come within the scope of the present disclosure.

What is claimed is:

1. A lane departure prevention system comprising:
a controller provided in a vehicle, configured to control at least one of a steering assembly and a brake circuitry based on front road information and dynamic information such that the vehicle is prevented from departing from a lane,
wherein the controller is configured to:
calculate a time up to a time point when a lane on which the vehicle is driven and a target path cross,
derive a deceleration value based on the calculated time, and
perform the braking control based on the determined deceleration value.

2. The lane departure prevention system of claim 1, wherein the controller is configured to derive the target path, along which the vehicle should be driven, based on the front road information.

3. The lane departure prevention system of claim 2, further comprising:
a display configured to output an image,
wherein the display outputs the target path for a driver of the vehicle to confirm the target path with the naked eye.

4. The lane departure prevention system of claim 2, wherein the controller is configured to derive a transverse acceleration and a transverse acceleration derivative value of the vehicle based on the dynamic information.

5. The lane departure prevention system of claim 4, wherein the controller is configured to compare the transverse acceleration and the transverse acceleration derivative value with set thresholds to determine a lane departure possibility of the vehicle that the vehicle departs from the target path.

6. The lane departure prevention system of claim 5, wherein the controller includes
a receiver configured to receive the front road information and the dynamic information,
a derivation circuitry configured to derive the target path, and the transverse acceleration and the transverse acceleration derivative value,
a determining circuitry configured to determine the lane departure possibility of the vehicle,
a steering controller configured to calculate a steering angle value to control the steering assembly according to determination of the determining circuitry, and
a braking controller configured to calculate the deceleration value to control the brake circuitry according to the determination of the determining circuitry.

7. The lane departure prevention system of claim 1, further comprising a sensor, provided in the vehicle, configured to acquire the front road information before the vehicle and the dynamic information of the vehicle,
wherein the sensor includes
a camera configured to acquire the front road information, and
one or more speed sensors configured to acquire the dynamic information.

8. A control method of a lane departure prevention system, comprising:
acquiring front road information before a vehicle and dynamic information of the vehicle;

deriving a target path of the vehicle, along which the vehicle should be driven, based on the front road information;

determining a lane departure possibility that the vehicle departs from the target path based on the front road information and the dynamic information; and controlling at least one of braking and steering of the vehicle based on the determining of the lane departure possibility, wherein the braking control of the vehicle includes:

calculating a time up to a time point when a lane on which the vehicle is driven and the target path cross, deriving a deceleration value based on the calculated time, and performing the braking control based on the determined deceleration value.

9. The control method of a lane departure prevention system of claim 8, wherein the determining of the lane departure possibility includes:

deriving a transverse acceleration and a transverse acceleration derivative value based on the dynamic information, and comparing the transverse acceleration and the transverse acceleration derivative value with set thresholds.

10. The control method of a lane departure prevention system of claim 9, wherein when it is determined that the transverse acceleration and the transverse acceleration derivative value are higher than the set thresholds in the comparing, both braking control of the vehicle and steering control of the vehicle are performed in the controlling of at least one of the braking and the steering of the vehicle.

11. The control method of a lane departure prevention system of claim 10, wherein when both the braking control of the vehicle and the steering control of the vehicle are performed, the braking control of the vehicle is first performed, and then the steering control of the vehicle is performed.

12. The control method of a lane departure prevention system of claim 11, wherein the braking control of the vehicle is repeated until the transverse acceleration and the transverse acceleration derivative value become equal to or lower than the set thresholds.

13. The control method of a lane departure prevention system of claim 11, wherein the steering control of the vehicle includes:

calculating a steering angle value required for following the target path, and performing the steering control based on the calculated steering angle value.

14. The control method of a lane departure prevention system of claim 9, wherein when it is determined that the transverse acceleration and the transverse acceleration derivative value are equal to or lower than the set thresholds in the comparing, the steering control of the vehicle is performed in the controlling of at least one of the braking and the steering of the vehicle.

15. The control method of a lane departure prevention system of claim 14, wherein the steering control of the vehicle includes:

calculating the steering angle value required for following the target path, and performing the steering control based on the calculated steering angle value.

16. The control method of a lane departure prevention system of claim 8, wherein a sensor unit-including a camera and a speed sensor is provided in the vehicle, and in the acquiring of the front road information and the dynamic information, the camera is configured to acquire the front road information and the speed sensor is configured to acquire the dynamic information.

17. The control method of a lane departure prevention system of claim 8, wherein a display outputting an image is provided in the vehicle, the control method further comprising:

before the determining of the lane departure possibility, outputting the derived target path through the display.

* * * * *